(12) United States Patent
Dorey et al.

(10) Patent No.: US 10,022,819 B2
(45) Date of Patent: Jul. 17, 2018

(54) SAFETY CONFINEMENT EQUIPMENT FOR LASER RADIATION

(75) Inventors: Nicolas Dorey, Saint Etienne (FR); Jeremie Ruesch, St. Martin La Plaine (FR); Herve Thomasson, Seyssuel (FR)

(73) Assignee: Primetals Technologies France SAS, Savigneux (FR)

( * ) Notice: Subject to any disclaimer, the term of this patent is extended or adjusted under 35 U.S.C. 154(b) by 473 days.

(21) Appl. No.: 14/130,576

(22) PCT Filed: Mar. 21, 2012

(86) PCT No.: PCT/EP2012/055003
§ 371 (c)(1),
(2), (4) Date: Feb. 10, 2014

(87) PCT Pub. No.: WO2013/004404
PCT Pub. Date: Jan. 10, 2013

(65) Prior Publication Data
US 2014/0197141 A1     Jul. 17, 2014

(30) Foreign Application Priority Data
Jul. 1, 2011  (EP) .................................... 11290307

(51) Int. Cl.
*B23K 26/26*  (2014.01)
*B23K 26/12*  (2014.01)
(Continued)

(52) U.S. Cl.
CPC ........ *B23K 26/127* (2013.01); *B23K 26/0846* (2013.01); *B23K 26/26* (2013.01);
(Continued)

(58) Field of Classification Search
CPC ........................... B23K 26/127; B23K 26/706; B23K 26/0846; B23K 26/26; B23K 2201/16; F16P 1/06
See application file for complete search history.

(56) References Cited

U.S. PATENT DOCUMENTS

| | | | |
|---|---|---|---|
| 4,623,777 A | 11/1986 | Aihara et al. | |
| 5,747,768 A * | 5/1998 | Peru ................... | B23K 26/0838 219/121.13 |

(Continued)

FOREIGN PATENT DOCUMENTS

| | | |
|---|---|---|
| CN | 1124915 C | 10/2003 |
| CN | 101121223 A | 2/2008 |

(Continued)

*Primary Examiner* — Brian Jennison
(74) *Attorney, Agent, or Firm* — Laurence A. Greenberg; Werner H. Stemer; Ralph E. Locher

(57) ABSTRACT

Safety confinement equipment for laser radiation includes a safety confinement enclosure having two laterally opposite openings through which at least one metal strip can pass, the enclosure including first and second jaw devices for clamping the strip disposed on a path of travel of the strip between the two openings, the jaws being transversely disposed at least over the width of the strip. A cutting or welding equipment head emits a beam of laser radiation to be confined, in which the beam can be moved transversely between a pair of jaws disposed opposite each other on one side of a surface of the strip. In the position in which the jaws clamp the strip, the engagement of the jaws on the surfaces of the strip induces the formation of a physical screen against the laser radiation, which prevents the radiation from passing through the two openings of the chamber.

18 Claims, 2 Drawing Sheets

(51) Int. Cl.
  *B23K 26/08* (2014.01)
  *B23K 37/00* (2006.01)
  *F16P 1/06* (2006.01)
  *B23K 26/70* (2014.01)
  *B23K 101/16* (2006.01)

(52) U.S. Cl.
  CPC .......... *B23K 26/706* (2015.10); *B23K 37/006* (2013.01); *F16P 1/06* (2013.01); *B23K 2201/16* (2013.01)

(56) References Cited

U.S. PATENT DOCUMENTS

| | | | | |
|---|---|---|---|---|
| 5,948,295 A * | 9/1999 | Perret | ................ | B21B 15/0085 219/125.1 |
| 6,011,240 A | 1/2000 | Bishop et al. | | |
| 6,070,781 A | 6/2000 | Johnson et al. | | |
| 6,107,597 A * | 8/2000 | Staschewski | ........ | B23K 26/702 219/121.63 |
| 2004/0020902 A1 * | 2/2004 | McCoy | ................ | B23K 26/032 219/121.6 |

FOREIGN PATENT DOCUMENTS

| | | |
|---|---|---|
| DE | 202007001346 U1 | 5/2007 |
| JP | S60127089 A | 7/1985 |
| RU | 35111027 A | 6/1997 |
| RU | 2150362 C1 | 6/2000 |
| RU | 2288084 C1 | 11/2006 |
| WO | 9726110 A1 | 7/1997 |

* cited by examiner

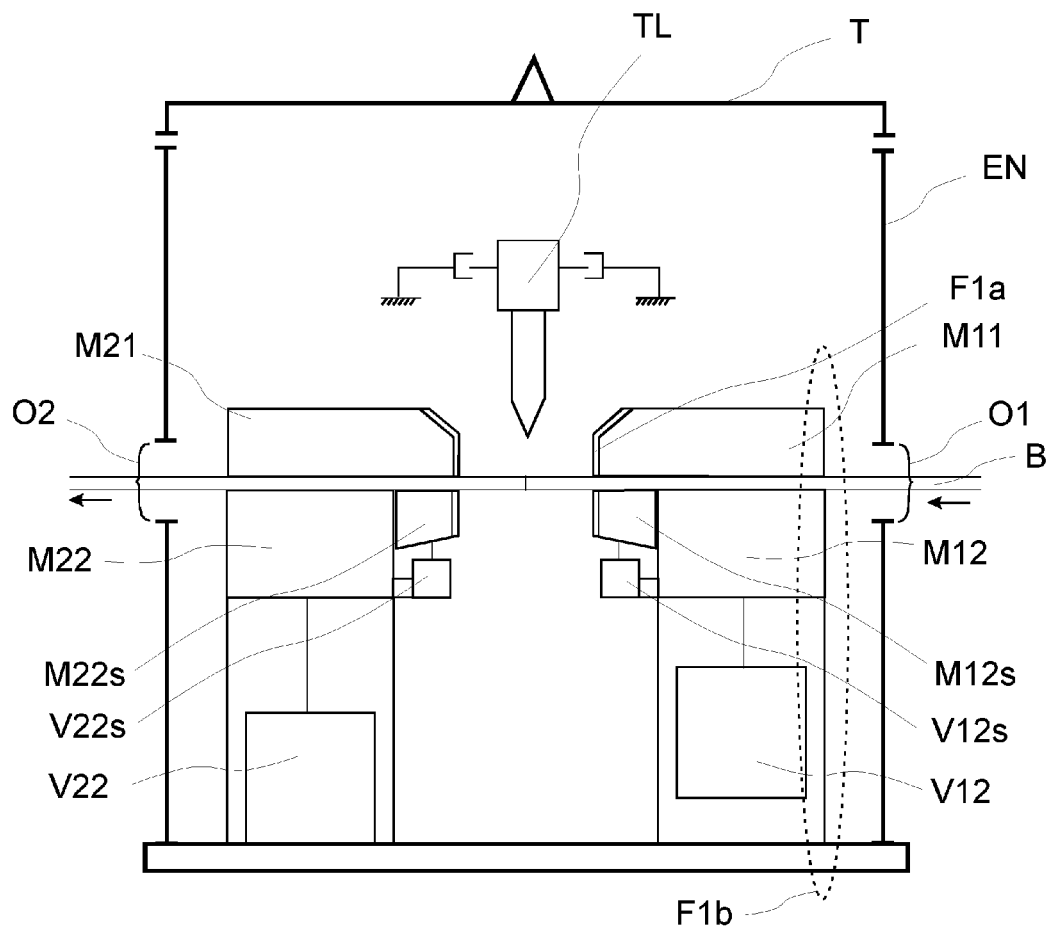
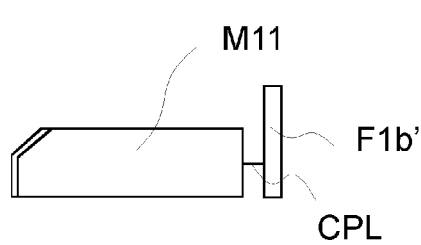
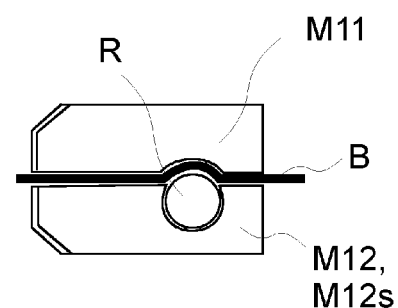
FIG 1
FIG 2
FIG 3

SAFETY CONFINEMENT EQUIPMENT FOR LASER RADIATION

BACKGROUND OF THE INVENTION

Field of the Invention

The present invention relates to safety confinement equipment for laser radiation and to a method for welding and cutting a material, particularly metal strips undergoing metallurgical operations.

As part of continuous-line metallurgical applications, strip butt welding machines offer several possible and known welding methods: flash, lapping, TIG, MIG and Laser. For welding machines known as laser welding machines, the type of source mainly used is a CO2 source. Other types of sources can also be used, such as sources known as ASOLID (also known as YAG, Disk or fiber types) with wavelengths around 1060 nm and offering numerous advantages including, among others, simplicity of the optical path, better yield and high beam quality. These sources can also be used, as the case may be, as a means for cutting a moving strip. In the rest of the present document, no differentiation will be made between welding and cutting applications, which both require the confinement which the invention proposes resolving. In fact, the disadvantage of such a type of laser source lies in the choice of beam wavelength and the inherent dangers, so that confinement has to be installed to prevent any accidents to others. Such confinement is not however without problems or is at least associated with different aspects:

- with too narrow confinement (for example encapsulating the welding zone), it is difficult for the operator to view the zone of operations in the machine (cutting and welding)
- the strips (originating from the welding machine or traveling toward the welding machine, from or toward an adjacent processing line, spooler, etc.) must be able to enter and leave the welding machine without any more difficulty than on traditional machines. In view of the fact that the moving strips are very long (several hundred meters), integral physical confinement is impossible around a strip to be cut or strips to be welded. Thus, the confinement can only comprise an enclosure encapsulating the welding/cutting machine exhibiting strip input and output openings, therefore there are possibilities for leakage of laser radiation through these openings.
- access to the machine for adjustment and maintenance must be as simple as possible.

BRIEF SUMMARY OF THE INVENTION

An object of the present invention is to propose laser safety confinement equipment for a device for laser cutting and/or welding of a strip entering or leaving said device.

Such equipment is thus proposed according to the invention. Methods of using this equipment are additionally proposed as part of cutting and/or welding metal strips entering or leaving said equipment, itself arranged in a line of travel of said strip.

It involves safety confinement equipment for laser radiation comprising:

- a safety confinement enclosure exhibiting at least two laterally opposite openings through which at least one metal strip can pass,
- the enclosure comprising first and second jaw devices for clamping the strip arranged on the path of travel of the strip between the two openings, wherein said jaws are arranged transversely over at least the width of the strip,
- a head of a cutting or welding equipment emitting a burst of laser radiation to be confined, said burst being able to be moved transversely between a pair of jaws positioned opposite each other on one side of a surface of the strip,
- wherein, in the position in which the jaws clamp the strip, the engagement of the jaws on the surfaces of the strip induces the formation of a physical screen to the laser radiation, preventing said radiation from passing through the two openings of the enclosure.

Said enclosure exhibits a first advantage of being scaled in order to cover the following equipment: laser radiation-emitting head, clamping jaws and their frame. In this way, the enclosure is of a size comparable to a room which an operator can enter by means of a single door positioned on one wall of said enclosure. Furthermore, it is also possible to arrange on the walls of the enclosure or even on a door at least one window making it possible to view the welding/cutting device, said windows being designed to filter any laser radiation in accordance with the applicable safety standards. Finally, the enclosure may include a movable roof allowing for major maintenance operations when the welding/cutting device is stopped (for example, removing said roof and moving a clamping jaw unit via a single overhead crane or other means of lifting. Moreover, it is then also possible to position control consoles for the welding/cutting device outside the enclosure and, apart from the window, viewing and control means can be installed in the enclosure controlled from the outside. Through these provisions, an operator can thus easily view the welding/cutting operations zone in the enclosure and can also enter the enclosure (laser switched off) and perform minor and even more major maintenance without any complexity or being cramped.

A second advantage of the equipment according to the invention lies in the fact that the enclosure is positioned as a cabin covering the strip welding/cutting device and only exhibiting in principle two openings for the input and output of at least one strip into or out of said cabin. In view of the fact that the engagement of the jaws obstructs the output of laser radiation via the two openings, the confinement is made safe simply and effectively without necessarily having to add doors to said confinement cabin. The confinement cabin can also be installed universally and simply around existing welding or cutting devices for which it is possible to install a laser with an "asolid" or other type of source. With such an installation, it will be provided that the openings in the cabin are positioned and scaled to be placed beneath the radiation screen with each pair of jaws adjacent to each of the openings in clamped position. More generally, the geometry of the pairs of jaws clamping the strip should provide the screen as simply as possible. Additional provisions according to the invention are presented through sub-claims also associated with advantages.

BRIEF DESCRIPTION OF THE SEVERAL VIEWS OF THE DRAWING

Exemplary embodiments and applications are provided using described figures:

FIG. 1 Safety confinement equipment for laser radiation according to the invention FIG. 2 Mechanically controlled screen FIG. 3 Screen integrated into jaw by corrugation FIG. 4 Deviation screen partially controlled by the jaw FIG. 5 Deviation screen produced by offsetting the pass line

DESCRIPTION OF THE INVENTION

Figure 4:
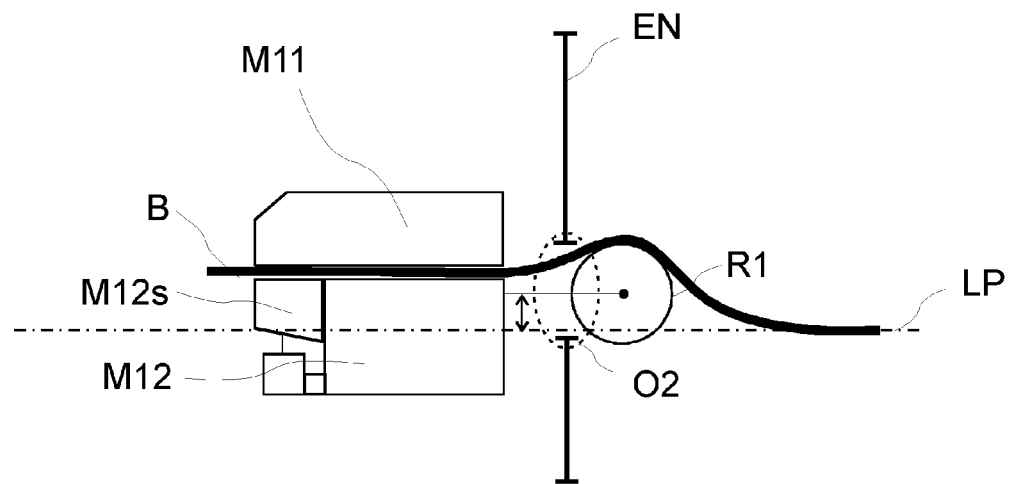

FIG. 1 presents an embodiment of the safety confinement equipment for laser radiation according to the invention comprising:

- a safety confinement enclosure (EN) exhibiting at least two laterally opposite openings (O1, O2) through which at least one metal strip (B) can pass, here in principle horizontally,
- the enclosure comprising first and second strip clamping jaw devices (M11, M12, M12s; M21, M22, M22s) arranged on the path of travel of the strip between the two openings, wherein said jaws are arranged transversely over at least the width of the strip,
- a radiation-emitting head (TL) of an installation for cutting or welding a strip or strips, said head emitting a vertical burst of laser radiation to be confined, said burst being able to be moved transversely between a pair of jaws (M11, M21) positioned opposite each other on one side of a surface of the strip (here the jaws known as upper above the strip),
- wherein, in the position in which the jaws clamp each face of the strip, the engagement of the jaws on the strip faces induces the formation of a physical screen (F1b) to the laser radiation, preventing said radiation from passing through the two openings of the enclosure. FIG. 1 clearly shows that the screen (F1b) is formed by a section of rear faces of the jaws (M11, M12; M21, M22) having a size which is extensive enough to shelter each opening from the radiation. Here, the term "rear" for the jaw faces (M11, M12; M21, M22) means closest to the openings (O1, O2).

In principle, the jaws above the strip (M11, M21) can be fixed or adjustable in height with respect to the strip and the jaws below the strip (M12, M22) can be moved vertically away from the strip by means of jacks (V12, V22) positioned on a frame covered by the enclosure (EN). The two clamping jaws below the strip (M12s, M22s) are jaws which are segmented transversely to the width of the strip (i.e. transversely to the travel of the strip) and allow more robust and precise clamping thanks to blocking/clamping means (V12s, V22s) independently distributed over each segment.

Thus, schematically the confinement enclosure (EN) covers the radiation-emitting head and the two columns of clamping jaws, each of the columns comprising respectively a clamping jaw above the strip, a clamping jaw below the strip and a series of segmented clamping jaws below the strip. As a general rule, at least one of the two columns is also movable laterally and the equipment according to the invention provides that, in at least one position of the movable column furthest away from an adjacent opening in the enclosure, the screen formed by the engagement of the jaws is provided to prevent any laser radiation from passing through said opening.

Said screen is complementarily formed by a radiation-absorbing coating (F1a) on the surfaces of the jaws (M11, M12s; M21, M22s) lateral to the radiation-emitting head. Such coatings are also provided on the internal walls of the enclosure to prevent any spurious reflection of radiation originating from the radiation-emitting head or from reflecting surfaces, such as inevitably that of the strip beneath the radiation-emitting head.

As already mentioned above, FIG. 1 provides for a representation of the movable roof (T) of the enclosure (EN), thus forming at least a third upper opening in the enclosure which can be plugged. Even though not represented, at least one door and one window are provided in at least one of the walls without openings (O1, O2), i.e. parallel to the direction of travel of the strip. Monitoring means are positioned in the enclosure in order to ensure that the doors, roof, etc. are closed before any activation of the radiation.

The laser radiation is emitted by a laser unit with a wavelength in the near infrared around 1000 nm, ideally in a range matched to laser applications of the fiber/disk type around 1060 nm up to a laser application of the diode type around 870 nm. Thus, the confinement equipment according to the invention is suitable for various levels of safety requirements relating to lasers for different usages (laser welding and/or cutting) and strip formats/materials.

For this purpose, multiple uses of the confinement equipment are possible.

A use of the laser confinement equipment according to the invention is to provide that the radiation-emitting head is a laser strip cutter.

An alternative or complementary use of the laser confinement equipment according to the invention is to provide that the radiation-emitting head (or a second radiation-emitting head) is a laser welder of a tail of a first strip and of a head of a second strip. In this case, the tail of one of the strips is brought to and held in a first clamping jaw (=first column of clamping jaws) and the head of the second strip is brought to and held in a second clamping jaw (=second column of clamping jaws) opposite the first clamping jaw and, when the two strips are held in the jaws in clamped position, activation of radiation is permitted. Finally, such a use provides that:

- before bringing the tail of a first strip across the first and then the second clamping jaw, the two clamping jaws are placed in unclamped position and simultaneously actuate mechanical separation sufficient to allow the passage of the first strip across an output opening and an input opening of a laser confinement enclosure enclosing at least the jaws and the welding head, this step preventing the activation of radiation,
- at the latest after completion of bringing the head of the second strip into position and holding it in the second jaw, the two jaws are returned to clamped position and induce a screen to the passage of laser radiation outside the enclosure so as to allow the activation of radiation.

FIG. 2 presents, on the basis of FIG. 1, an embodiment of the desired screen by mechanical control at the jaws. The example is given on one of the upper jaws (M11) but could be given on any other jaws (M12, M21, M22 . . . ). The screen is thus formed by one or more walls (F1b') controlled mechanically upon clamping of the jaw or jaws (for example M11 with M12) by means of a mechanical coupling (CPL). This system is particularly effective if the intrinsic geometrical coupling of the jaws does not constitute a sufficiently safe screen against radiations which might emerge through the openings. Such a wall can also be a door locally plugging the opening half way up the height of a surface of a strip.

Alternatively or complementarily to FIGS. 1 and 2, the screen can also be formed by a plugging network of the labyrinth type between the jaws and each of the openings. The arrangement of this type of network is such that, if the jaws are engaged, said network plugs remaining possible paths of radiation toward the openings (O1, O2).

The equipment according to the invention also provides that the screen can be formed by a transverse distribution segmented into a plurality of jaws (called above "segmented" (M12s, M22s), the jaw segments of which outside a strip clamping zone and lateral to said strip can be placed side by side. This screen effect "with variable width" at the edges of the strip is particularly good for welding/cutting devices suitable for strips with highly variable format and thus width. Depending on the number of segments provided, it is possible that at least one of the segmented jaws on the edge of the strip gives rise to an interstice which is permeable to radiation if the radiation-emitting head approaches it and the screen can thus be envisaged to be formed by movable walls lateral to the strip which are brought to the edge of the strip in a position clamped by jaws (this option of lateral movable screens is also suitable for clamping jaws above and below the strip and not segmented).

FIG. 3 presents a screen integrated into two jaws by corrugation of the strip by means of a roller (R) the length of which is greater than that of the upper and lower jaws (M11, M12 or M21, M22) (the lower jaws M12, M22 being able to be complementarily segmented or not) in clamped position on the strip. The roller is in principle arranged transversely to the travel in one of the two jaws and one part of its cylindrical cross-section turns in a recess in the other jaw. Radiation originating from the radiation-emitting head between the two clamped jaws and with no strip present (at the edges of the strip) is thus stopped by the presence of the roller forming a screen at the opening on the rear jaw surface. This embodiment of a screen makes it possible completely to block residual radiation propagating between the clamping jaws, advantageously whatever the width of the strip when the length of the roller is greater than that of the strip or opening width.

Apart from this last possibility by means of a cylindrical recess distributed over two jaw clamping surfaces and more generally, the screen can thus be formed by a strip deviation in or between the jaws and each of the openings, ideally by corrugating or staggering said strip.

FIG. 4 presents an alternative or complementary screen with deviation or corrugation, here also partially controlled by the lower clamping jaw (M12, M12s), wherein the corrugation is produced by means of a deviation element transverse to the travel of the strip such as a roller (R1), said roller being able to be coupled to the rear of at least one movable jaw of a pair of jaws and even positioned outside the enclosure so that the strip entering or leaving through one of the openings enters or leaves at an inclination blocking the passage of radiation from the interior to the exterior of the enclosure. In the example according to FIG. 4 and on one side of the enclosure with an opening for example for the input of a strip, the strip arrives through the enclosure on a line (LP) situated between the pair of upper and lower jaws (M11; M12, M12s) in open position and the element (R1)—a roller—coupled mechanically for example to the lower jaw (M12) rises up when said jaw approaches the upper jaw.

In coupled strip clamping position, the roller (R1) has created corrugation of the strip, thus forming a screen through the inclination of the strip in the opening. The dimensions of the element (or diameter of said roller) can be selected to exceed the dimensions of the opening in the enclosure and provide increased safety confinement.

Figure 5:
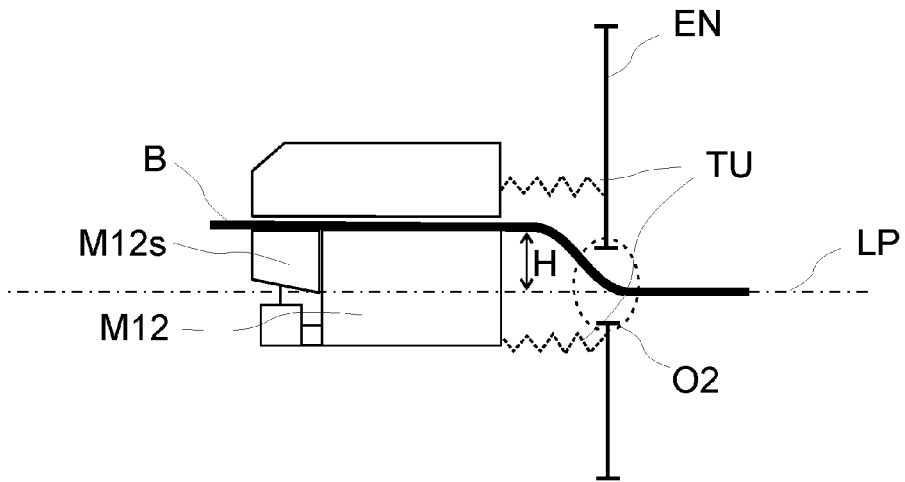

FIG. 5 presents an alternative or complementary screen with deviation by offsetting the pass line, here for example partially controlled by the lower clamping jaw (M12, M12s), wherein a strip deviation is produced by a movement (H) of at least one of the jaws outside a median line of travel (see the flat hatched line outside the enclosure), here when the lower jaw is clamping (M12, M12s). The rear surface of the jaws of each column of jaws is thus more centered and therefore covers more of an opening in the enclosure and the deviation contributes to additionally accentuating this screen in each respective opening.

Finally, the equipment according to the invention and according to all the preceding figures can also include a safety means with tunnel walls (TU) (or other type of sleeve) linking the rear surfaces of the columns of jaws and the perimeter of openings opposite. At least one wall of the tunnel is movable or deformable so as to make it possible to follow potential jaw movements (lateral, vertical). More generally, said tunnel can thus have variable geometry. In jaw engagement position, a screen is formed by means of the tunnel around the strip between the jaws and each opening, said tunnel absorbing or at least preventing any residual spurious radiation from emerging from the enclosure via any free space between each column of jaws and the adjacent opening in the enclosure.

The invention claimed is:

1. Safety confinement equipment for laser radiation, the equipment comprising:
   a safety confinement enclosure having at least two laterally opposite openings through which at least one metal strip can pass along a travel path of the strip;
   first and second jaw devices having jaws disposed in said enclosure transversely over at least the width of the strip and configured to clamp the strip along the travel path between said openings; and
   a cutting equipment head configured to emit a burst of laser radiation to be confined and to be moved transversely between a pair of said jaws positioned opposite each other on one side of a surface of the strip;
   said jaws configured to engage surfaces of the strip while in a position clamping the strip and to induce a formation of a physical screen to the laser radiation, preventing the laser radiation from passing through said openings of said enclosure;
   said safety confinement enclosure having a top surface completely covering said jaws and said cutting equipment head;
   said jaws completely sheltering each of said openings from the laser radiation and forming said screen.

2. The equipment according to claim 1, which further comprises a radiation-absorbing coating disposed on surfaces of said jaws lateral to said radiation-emitting head and configured to form said screen.

3. The equipment according to claim 1, which further comprises walls controlled mechanically when said jaws clamp to form said screen.

4. The equipment according to claim 1, wherein said screen is formed by a deviation of the strip between said jaws and each of said openings.

5. The equipment according to claim 4, wherein said deviation of the strip is provided by corrugating or staggering the strip.

6. The equipment according to claim 4, wherein said deviation of the strip is produced by a movement of at least one of said jaws outside a median line of travel.

7. The equipment according to claim 5, which further comprises an element disposed transverse to a travel direction of the strip and configured to produce the corrugation.

8. The equipment according to claim 7, wherein said element is disposed at a rear of a pair of said jaws in said travel direction of the strip.

9. The equipment according to claim 7, wherein said jaws have jaw clamping surfaces, and said element is a roller disposed in a cylindrical recess distributed over two of said jaw clamping surfaces.

10. The equipment according to claim 1, wherein said screen is formed by a labyrinth-type plugging network disposed between said jaws and each of said openings.

11. The equipment according to claim 1, wherein said screen is formed by a transverse distribution segmented into a plurality of jaws having jaw segments to be placed side by side outside a strip clamping zone and lateral to the strip.

12. The equipment according to claim 1, wherein said screen is formed by movable walls disposed lateral to the strip and configured to be brought to an edge of the strip in a position clamped by said jaws.

13. The equipment according to claim 1, wherein said screen is formed by a tunnel or sleeve disposed around the strip between said jaws and each of said openings, said tunnel having a variable geometry.

14. The equipment according to claim 1, wherein said head is part of a laser unit emitting the laser radiation with a wavelength in the near infrared around 1000 nm or in a range matched to a laser application of a fiber/disk type around 1060 nm up to a laser application of the diode type around 870 nm.

15. The equipment according to claim 1, which further comprises a movable roof configured to plug at least a third upper opening in said enclosure.

16. The equipment according to claim 1, wherein said cutting equipment head is a radiation-emitting head formed as a laser strip cutter.

17. The equipment according to claim 16, wherein said jaws include a first clamping jaw configured to receive and hold the tail of the first strip and a second clamping jaw disposed opposite said first clamping jaw and configured to receive and hold the head of the second strip, and said radiation-emitting head is configured to permit activation of radiation when the first and second strips are held in said first and second clamping jaws in a clamped position.

18. The equipment according to claim 17, wherein:
said enclosure confines at least said jaws and said radiation emitting head;
said openings of said enclosure include an input opening and an output opening;
said first and second clamping jaws are configured to be placed in an unclamped position and to simultaneously actuate mechanical separation sufficient to allow passage of the first strip across said output opening and said input opening, before bringing the tail of the first strip across said first and then said second clamping jaw, to prevent activation of radiation from said head and
said first and second clamping jaws are configured to be returned to a clamped position and to induce said screen to prevent a passage of laser radiation outside said enclosure to allow activation of the radiation, at the latest after completion of bringing the head of the second strip into position and holding it in said second jaw.

* * * * *